US009811491B2

(12) United States Patent
DeCesaris et al.

(10) Patent No.: US 9,811,491 B2
(45) Date of Patent: Nov. 7, 2017

(54) MINIMIZING THERMAL IMPACTS OF LOCAL-ACCESS PCI DEVICES (71) Applicant: Lenovo Enterprise Solutions (Singapore) Pte. Ltd., Singapore (SG)

(72) Inventors: Michael DeCesaris, Carrboro, NC (US); Luke D. Remis, Raleigh, NC (US); Brian C. Totten, Durham, NC (US); John K. Whetzel, Holly Springs, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 290 days.

(21) Appl. No.: 14/680,724

(22) Filed: Apr. 7, 2015

(65) Prior Publication Data

US 2016/0299864 A1    Oct. 13, 2016

(51) Int. Cl.
*G06F 3/00* (2006.01)
*G06F 13/40* (2006.01)
*G06F 13/42* (2006.01)

(52) U.S. Cl.
CPC ...... *G06F 13/4027* (2013.01); *G06F 13/4221* (2013.01)

(58) Field of Classification Search
None
See application file for complete search history.

(56) References Cited

U.S. PATENT DOCUMENTS

| | | |
|---|---|---|
| 7,349,762 B2 | 3/2008 | Omizo et al. |
| 7,653,824 B2* | 1/2010 | Rangarajan ............ G06F 1/206 713/300 |
| 8,218,257 B2* | 7/2012 | Escobar-Bowser .... G11B 19/00 360/46 |
| 8,499,141 B2 | 7/2013 | Swnson et al. |
| 8,527,808 B2 | 9/2013 | Kelly et al. |
| 8,595,404 B2 | 11/2013 | Liu et al. |
| 2011/0161592 A1 | 6/2011 | Nachimuthu et al. |

(Continued)

OTHER PUBLICATIONS

Kevin Li, et al. "UEFI Firmware Solutions for Enterprise Servers: A Case Study in 8-way Processor Support" IDF2010 Intel Developer Forum, http://uefidk.intel.com/sites/default/files/uefi-firmware-solutions-enterprise-servers%5B1%5D.pdf, EFIS005, Jan. 14, 2010, 37 pages.

*Primary Examiner* — Idriss N Alrobaye
*Assistant Examiner* — Richard B Franklin
(74) *Attorney, Agent, or Firm* — Jeffrey L. Streets (57) ABSTRACT A method includes performing operations on a compute node including a plurality of processors each having a local PCI processing element and a local processor interconnect, wherein the local processor interconnect of each processor is connected to the local processor interconnect of at least one other processor. The method further includes identifying a PCI device that is directly attached to the local PCI processing element of a first one of the processors and positioned in an upstream airflow direction from the first processor. The operating system monitors the PCI device and, in response to determining that the PCI device is performing a power-intensive operation, directs operations away from the first processor to a second one of the processors, wherein the local processor interconnect of the second processor is directly connected to the processor interconnect of the first processor.

19 Claims, 4 Drawing Sheets

(56) References Cited

U.S. PATENT DOCUMENTS

| | | |
|---|---|---|
| 2012/0162234 A1 | 6/2012 | Blinzer et al. |
| 2013/0305067 A1 | 11/2013 | Lefurgy et al. |
| 2014/0095944 A1 | 4/2014 | Alexander et al. |
| 2014/0115207 A1 | 4/2014 | Iyer et al. |
| 2015/0324312 A1* | 11/2015 | Jacobson ............ G06F 13/4022 710/104 |

* cited by examiner

Processor Interconnect Topology

| Interconnect | Endpoint 1 | Endpoint 2 |
|---|---|---|
| A | CPU 1 | CPU 2 |
| B | CPU 2 | CPU 3 |
| C | CPU 3 | CPU 4 |
| D | CPU 4 | CPU 1 |
| E | CPU 1 | CPU 3 |
| F | CPU 2 | CPU 4 |

} ring

} fully meshed

Direct-Attached PCI Devices

| PCI Device | CPU Attachment |
|---|---|
| D1 | CPU 1 |
| D2 | CPU 2 |

MINIMIZING THERMAL IMPACTS OF LOCAL-ACCESS PCI DEVICES

BACKGROUND

Field of the Invention

The present invention relates to thermal management in an air cooled compute node chassis.

Background of the Related Art

Compute nodes include a number of electronic components that perform work and generate undesirable heat. Much of this heat must be removed from heat-generating electronic components, such as processors, in order to avoid high temperatures that can damage the components. Many of the heat-generating electronic components are coupled to a generally planar circuit board or motherboard or are disposed in some specific relation to the circuit board and the other components. The circuit board allows for the distribution of electrical current and the communication of data to and from the heat-generating electronic components. While the arrangement of components on the circuit board is somewhat flexible, certain components that work together or require fast, accurate data transfer should be positioned close together.

Heat generated by an electronic component may be transferred by conduction to a heat sink having a plurality of fins, pins or other high surface area structure for contact with air flowing through a computer chassis housing the circuit board. One or more air movers, such as fans, may be used to move air through the compute node chassis so that the air will flow across the fins to enhance dissipation of heat from the heat sink. Air movers are fixed relative to the computer chassis to draw air into one end of the chassis, across components disposed within the chassis, and then through the air movers to exit the chassis.

However, a compute node may experience changes in configuration and operation that affect the ability of air cooling to manage the temperature of the components. For example, removing a dual in-line memory module (DIMM) from a compute node forms an area of low airflow resistance such that cool air may channel past adjacent DIMMs without removing much heat. As another example, a processor or disk drive may handle a workload that varies over time, such that the amount of heat generated by the component varies similarly. Accordingly, a compute node may utilize additional strategies for managing the temperature of the components, such as throttling a processor to reduce its heat generation before it gets so hot as to damage itself. While effective, processor throttling represents a loss of performance. Even increasing the air flow rate through the chassis is not always the best way to prevent high temperatures, since fans consume increasing amounts of electricity at higher speeds.

BRIEF SUMMARY

One embodiment of the present invention provides a method that comprises performing operations on a compute node including a plurality of processors, each processor having a local PCI processing element and a local processor interconnect, wherein the local processor interconnect of each processor is connected to the local processor interconnect of at least one other processor. The method further comprises identifying a PCI device that is directly attached to the local PCI processing element of a first one of the processors and positioned in an upstream airflow direction from the first processor. Still further, the operating system monitors operation of the PCI device and determines whether the PCI device is performing a power-intensive operation. In response to determining that the PCI device is performing a power-intensive operation, the operating system directs operations away from the first processor to a second one of the processors, wherein the local processor interconnect of the second processor is directly connected to the processor interconnect of the first processor.

Another embodiment of the present invention provides a computer program product comprising a computer readable storage medium having program instructions embodied therewith, the program instructions executable by a processor to cause the processor to perform a method. The method may comprise performing operations on a compute node including a plurality of processors, each processor having a local PCI processing element and a local processor interconnect, wherein the local processor interconnect of each processor is connected to the local processor interconnect of at least one other processor. The method further comprises identifying a PCI device that is directly attached to the local PCI processing element of a first one of the processors and positioned in an upstream airflow direction from the first processor. Still further, the operating system monitors operation of the PCI device and determines whether the PCI device is performing a power-intensive operation. In response to determining that the PCI device is performing a power-intensive operation, the operating system directs operations away from the first processor to a second one of the processors, wherein the local processor interconnect of the second processor is directly connected to the processor interconnect of the first processor.

DETAILED DESCRIPTION

One embodiment of the present invention provides a method that comprises performing operations on a compute node including a plurality of processors, each processor having a local PCI processing element and a local processor interconnect, wherein the local processor interconnect of each processor is connected to the local processor interconnect of at least one other processor. The method further comprises identifying a PCI device that is directly attached to the local PCI processing element of a first one of the processors and positioned in an upstream airflow direction from the first processor. Still further, the operating system monitors operation of the PCI device and determines whether the PCI device is performing a power-intensive operation. In response to determining that the PCI device is performing a power-intensive operation, the operating system directs operations away from the first processor to a second one of the processors, wherein the local processor interconnect of the second processor is directly connected to the processor interconnect of the first processor.

The local PCI processing element and the local processor interconnect may be provided in an "uncore" that is formed on the same chip as the processor. Accordingly, the close proximity of the processor and the components of the uncore enable fast and accurate communications. A PCI device may be directly physically attached to the PCI processing element or PCI bus established by the PCI processing element, rather than requiring an adapter of some sort attached to the bus and the PCI device attached to the adapter.

The use of PCI devices, such as a PCI disk drive, provide many advantages, but their power consumption is both higher and more variable than existing drives. For instance, writes are much more power-intensive than reads. Furthermore, the direct-attached PCI device must be positioned close to the PCI processing element in order to take advantage high communication rates and accuracy. Unfortunately, because of the required positioning and the additional power consumption, the drives provide a heat source at the front of the compute node, directly ahead of the processors. This additional heat can cause thermal issues for the processors and the compute node as a whole. Embodiments of the present invention direct operations away from a processor that is subject to thermal issues as a result of being physically located in the downstream airflow from such a direct-attached PCI device.

The operations that are directed away from the processor may be any operations, jobs or tasks, since any reduction in workload will result in lower power consumption and less heat generation. Optionally, the method may include identifying the power-intensive task that the PCI device is performing, and directing the identified power-intensive task to be handled through the second processor. In another option, the operating system may route operations from a device driver for the PCI device to the second processor. Still further, the operating system may receive an interrupt request from the PCI device and cause the interrupt request to be handled by the second processor. By directing operations away from the processor that is subject to overheating, it may be possible to transition the first processor to a reduced power-state.

In a further embodiment, a unified extensible firmware interface provides system hardware topology information to the operating system, for example using an advanced configuration and power interface (ACPI) table. The system hardware topology may be either dynamically-discovered by the UEFI or programmed statically into the UEFI based on the compute node type and configuration. This initialization will involve detecting how many processors are available, how the processors are connected to one another, whether PCI devices are installed, and how any PCI devices are physically related to the processors. The connection information will include the processor interconnect topology (or QPI topology) which will show whether the processors are connected in a fully-meshed configuration, ring configuration, or some other configuration.

The system hardware topology information may identify the PCI devices that are directly attached to each processor, and may identify which of the processors are directly connected through the processor interconnects of those processors. For example, the PCI devices may be, without limitation, a network adapter or a PCI disk drive. Optionally, the PCI device is a disk drive that is hot-pluggable into a bay of a chassis containing the plurality of processors, wherein the bay is directly in front of the first processor.

Embodiments where the PCI device is a disk drive may identify write operations as the power-intensive operations. Accordingly, the PCI disk drive is expected to generate a greater amount of heat when performing a write operation than when performing a read operation. The method may includes determining whether the operation begin performed by PCI disk drive is a write operation or a read operation, wherein the operating system directs operations away from the first processor to the second processor only in response to detecting that the operation is a write operation. Furthermore, the method may include the operating system directing operations away from the first processor to the second processor only in response to detecting that the operation is a write operation involving greater than a setpoint amount of data. In yet another option, the method may include identifying the temperature of the first processor, and determining whether the temperature of the first processor is greater than a setpoint temperature, wherein the operating system directs operations away from the first processor to the second processor only in response to determining that the temperature of the first processor is greater than the setpoint temperature.

Another embodiment of the present invention provides a computer program product comprising a computer readable storage medium having program instructions embodied therewith, the program instructions executable by a processor to cause the processor to perform a method. The method may comprise performing operations on a compute node including a plurality of processors, each processor having a local PCI processing element and a local processor interconnect, wherein the local processor interconnect of each processor is connected to the local processor interconnect of at least one other processor. The method further comprises identifying a PCI device that is directly attached to the local PCI processing element of a first one of the processors and positioned in an upstream airflow direction from the first processor. Still further, the operating system monitors operation of the PCI device and determines whether the PCI device is performing a power-intensive operation. In response to determining that the PCI device is performing a power-intensive operation, the operating system directs operations away from the first processor to a second one of the processors, wherein the local processor interconnect of the second processor is directly connected to the processor interconnect of the first processor.

The foregoing computer program products may further include computer readable program code for implementing or initiating any one or more aspects of the methods described herein. Accordingly, a separate description of the methods will not be duplicated in the context of a computer program product.

Figure 1:
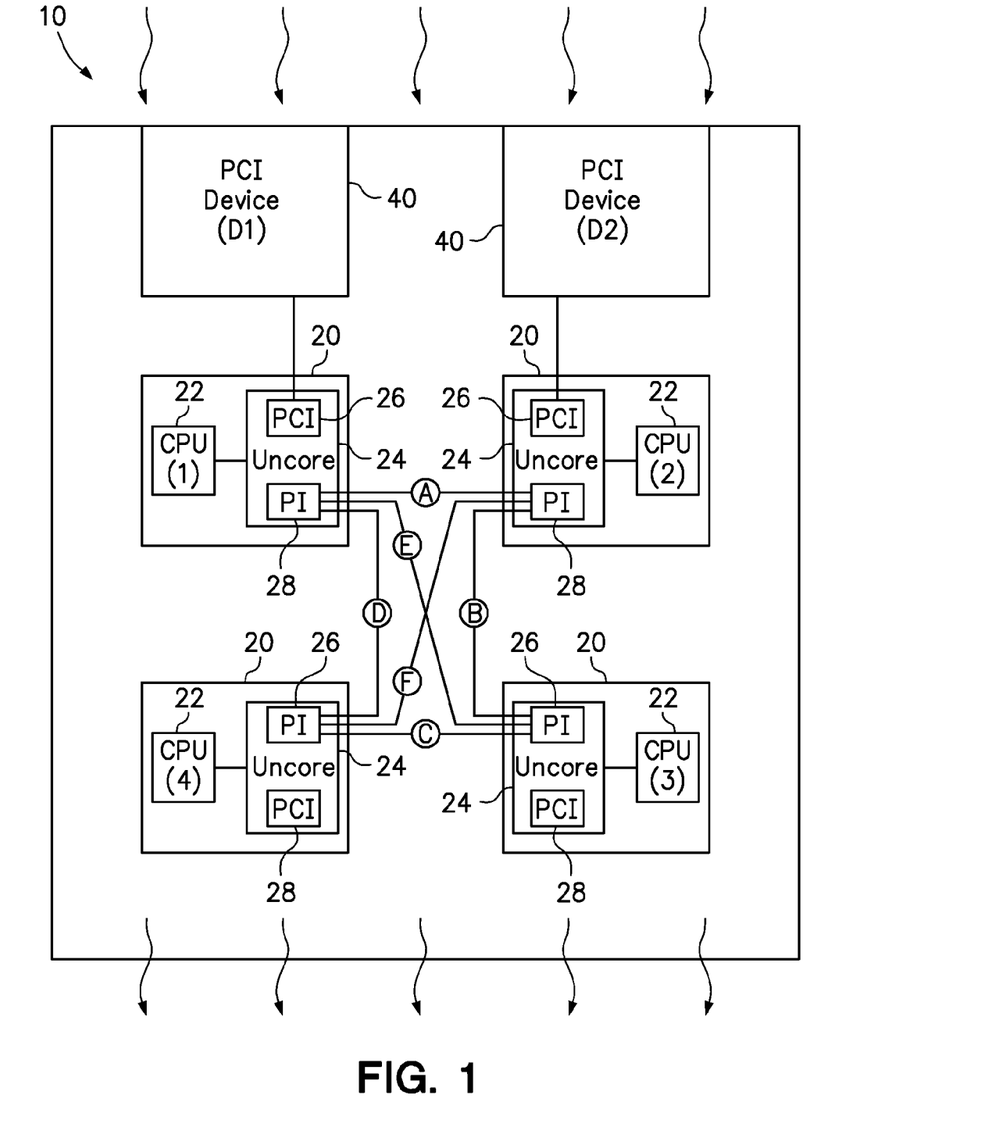
FIG. 1 is a diagram of a compute node having multiple interconnected processors and multiple direct-attached PCI devices.

FIG. 1 is a diagram of a compute node 10 having multiple interconnected processors 22 and multiple direct-attached PCI devices 40. Each of the processors 22 may be formed on an integrated circuit chip 20 along with an uncore 24. Each uncore 24 includes a PCI processing element 26 that establishes a local PCI bus and a processor interconnect 28 that enables communication between processors. As shown, the two PCI devices 40 are directly coupled to the PCI processing element 26 that is part of the closest integrated circuit chip 20. The close proximity of a direct-attached PCI device to the PCI processing element 26 and processor 22 facilitates fast and accurate communication.

The processors 22 are interconnected for communication using the processor interconnects 28 on the respective integrated circuit chips 20. Connections A-F are representative of communication channels coupled between two processor interconnects 28. The extent of these connections may be described as a configuration. For example, the six connections A-F connecting the four processors establish a fully meshed configuration, where each of the processors has a direct connection with every other processor. If only the four connections A-D were used, then the configuration might be described as a ring configuration, wherein each processor is directly connected to one processor to the right (in the ring) and directly connected to another processor to the left (in the ring). However, having four processors in a ring configuration means that there are processors that are only indirectly connected. For example, if the connection F were removed, then the two processors (CPU2 and CPU4) would not be in direct communication and any communication would be indirect since the communication would have to be routed through either CPU1 or CPU3.

Figure 2:
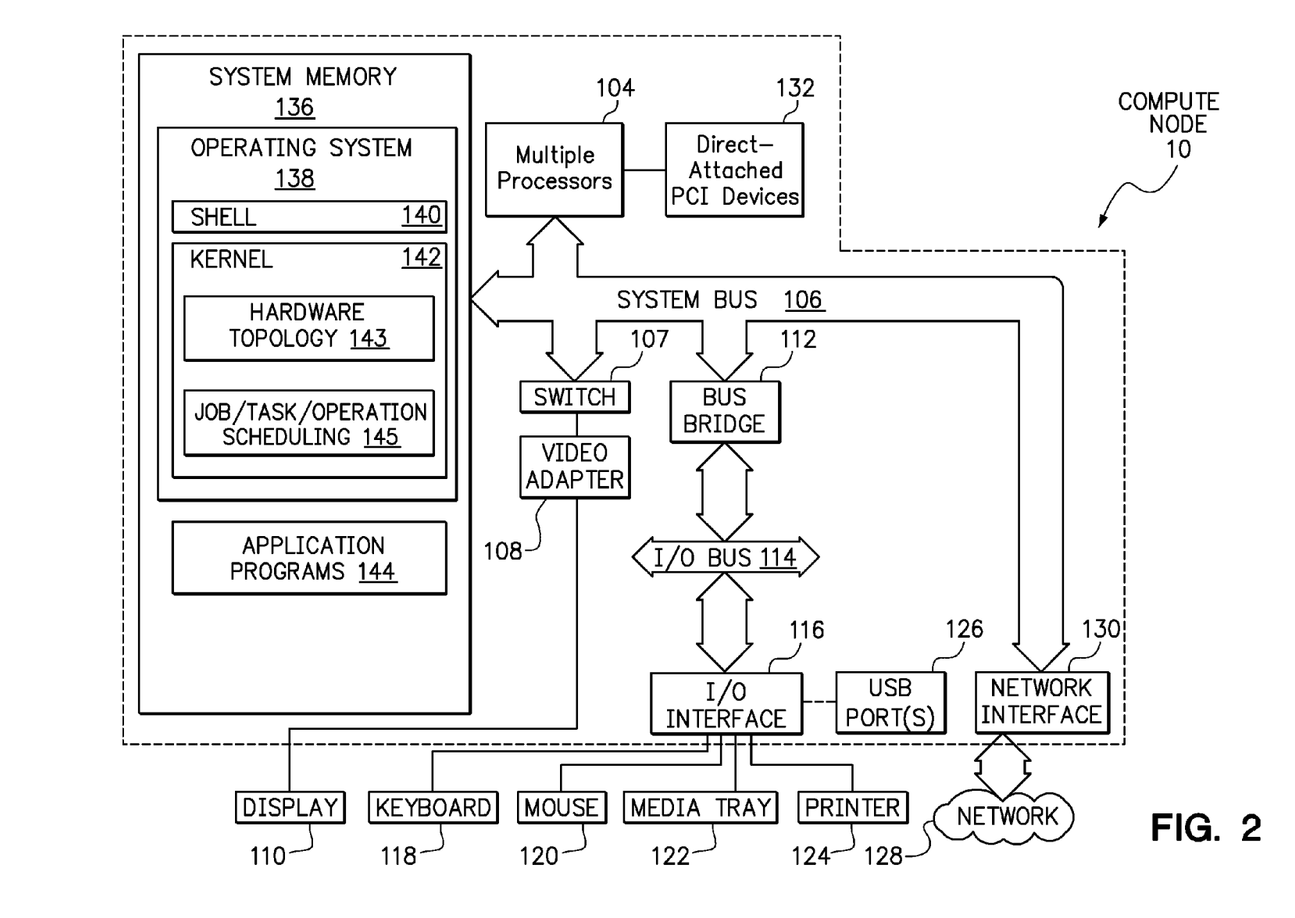
FIG. 2 is a diagram of a compute node.

FIG. 2 is a diagram of the compute node 10 illustrated other aspects of the compute node in accordance with one or more embodiments of the present invention. Note that some or all of the exemplary architecture, including both depicted hardware and software, shown for and within the compute node 10 may be implemented in the compute node of FIG. 1.

The compute node 10 includes a processor unit 104 that includes multiple processors coupled to a system bus 106. A video adapter 108, which drives/supports a display 110, is also coupled to system bus 106. In one embodiment, a switch 107 couples the video adapter 108 to the system bus 106. Alternatively, the switch 107 may couple the video adapter 108 to the display 110. In either embodiment, the switch 107 is a switch, preferably mechanical, that allows the display 110 to be coupled to the system bus 106, and thus to be functional only upon execution of instructions that support the processes described herein.

The system bus 106 is coupled via a bus bridge 112 to an input/output (I/O) bus 114. An I/O interface 116 is coupled to I/O bus 114. The I/O interface 116 affords communication with various I/O devices, including a keyboard 118, a mouse 120, a media tray 122 (which may include storage devices such as CD-ROM drives, multi-media interfaces, etc.), a printer 124, and external USB port(s) 126. While the format of the ports that are connected to I/O interface 116 may be any known to those skilled in the art of computer architecture, in a preferred embodiment some or all of these ports are universal serial bus (USB) ports. As depicted, the compute node 10 is able to communicate over a network 128 using a network interface 130. Network 128 may be an external network such as the Internet, or an internal network such as an Ethernet or a virtual private network (VPN).

In some compute nodes, a hard drive interface may also be coupled to the system bus 106 in order to interface with a hard drive (now shown). However, in the embodiment shown, direct-attached PCI devices 132, such as a hard disk drive, are connected directly to the PCI processing element of one of the processors in the processing unit 104. In either embodiment, a hard disk drive or other non-volatile data storage device may populate a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes an operating system (OS) 138 and application programs 144 of the compute node 10.

The operating system 138 includes a shell 140 for providing transparent user access to resources such as application programs 144. Generally, the shell 140 is a program that provides an interpreter and an interface between the user and the operating system. More specifically, the shell 140 executes commands that are entered into a command line user interface or from a file. Thus, the shell 140, also called a command processor, is generally the highest level of the operating system software hierarchy and serves as a command interpreter. The shell may provide a system prompt, interpret commands entered by keyboard, mouse, or other user input media, and send the interpreted command(s) to the appropriate lower levels of the operating system (e.g., a kernel 142) for processing. Note that while the shell 140 is a text-based, line-oriented user interface, the present invention will equally well support other user interface modes, such as graphical, voice, gestural, etc.

As depicted, the operating system 138 also includes kernel 142, which includes lower levels of functionality for the operating system 138, including providing essential services required by other parts of the operating system 138 and application programs 144, including memory management, process and task management, disk management, and mouse and keyboard management. For example, the kernel 142 may include a hardware topology module 143 for discovering and storing a hardware topology of the compute node and a job/task/operation scheduling module 145 for scheduling jobs, tasks or operations to one of the processors.

The hardware elements depicted in the compute node 10 are not intended to be exhaustive, but rather are representative components suitable to constitute a compute node. For instance, the compute node 10 may include alternate memory storage devices such as magnetic cassettes, digital versatile disks (DVDs), Bernoulli cartridges, and the like. These and other variations are intended to be within the spirit and scope of the present invention.

Figure 3:
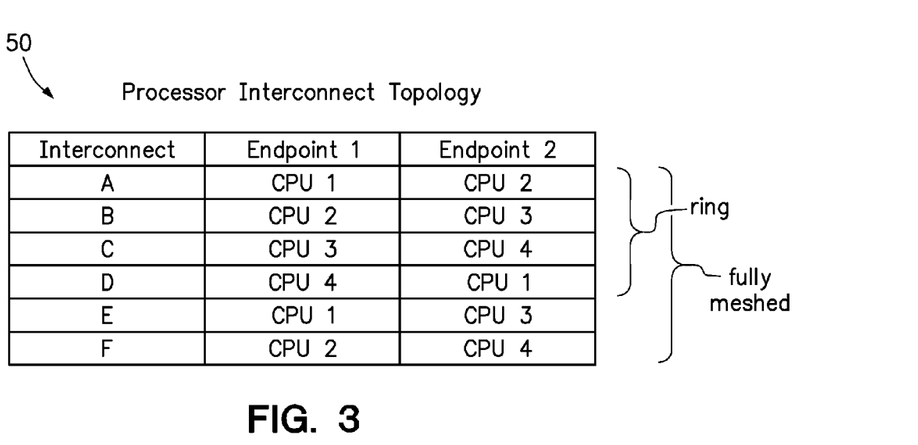
FIG. 3 is a table for storing a processor interconnect topology.

FIG. 3 is a table 50 for storing a processor interconnect topology. Each row of the table 50 identifies an interconnect and the two endpoints (Endpoint 1 and Endpoint 2) of that interconnect. While the endpoints are identified here by the CPU identity, it should be appreciated that the interconnect endpoints are actually the processor interconnects of those CPUs.

Referring briefly back to FIG. 1, the four processors 20 are connected to form a "fully meshed" configuration such that each of the processors is directly connected each of the other processors. A direct connection, as that term is used herein, means that the two processor interconnects enable communication between two processors without passing the communication through any other processors or other processor interconnects. In table 50, the six interconnects A-F define the fully meshed configuration shown in FIG. 1. However, if the processors were only connected with the first four interconnects A-D, then the processors would be in a "ring" configuration. In a ring configuration of four or more processors, a given processor is directly connected to only the processor to the right and the processor to the left (i.e., the processor in either direction in the ring). Accordingly, a given processor is indirectly connected to at least one other processor, such that communication between indirectly connected processors requires sending the communication through an intermediary processor or processor interconnect. Therefore, indirect communications are less efficient than direct communications. If a direct communication between two processors is considered to be "one hop", an indirect communication between two processors through another processor is considered to involve "two hops." Depending upon the configuration, it is possible to have processor communications that involve more than two hops.

Figure 4:
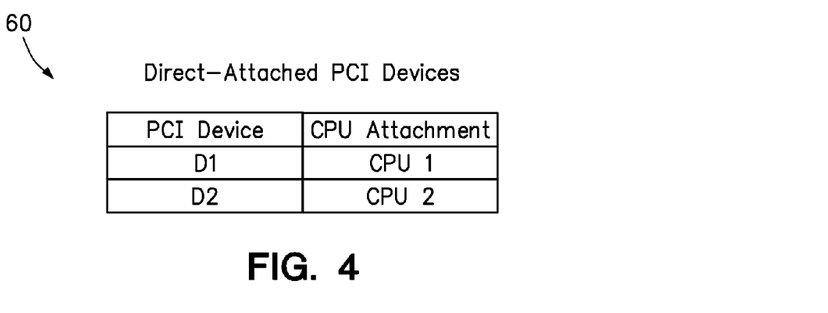
FIG. 4 is a table for storing a list of direct-attached PCI devices and the CPU to which each PCI device is attached.

FIG. 4 is a table 60 for storing a list of direct-attached PCI devices and the CPU to which each PCI device is attached. Referring briefly back to FIG. 1, the two direct-attached PCI devices 40 (D1 and D2) are directly connected to the PCI processing elements 26 of the respective CPUs 22 (CPU1 and CPU2). These connections are reflect in the two rows of the table 60. Accordingly, when an operation is directed to one of the direct-attached PCI devices 40, the scheduler can use the table 60 to determine which CPU is the closest.

According to various embodiments of the present invention, the operating system may, in response to determining that the PCI device is performing a power-intensive operation, directing operations away from the first processor (which is identified as being directly attached to the PCI device per table 60) to a second one of the processors (identified or selected from the processors having an interconnect with the first processor per table 50), wherein the local processor interconnect of the second processor is directly connected to the processor interconnect of the first processor.

In a specific example based on FIGS. 1, 3 and 4, assume that the operating system determines that PCI device D1 is performing a power-intensive operation, such that PCI device D1 is expected to generate a significant amount of heat. Since table 60 identifies CPU1 as directly attached to the PCI device D1, it is most efficient for CPU1 to handle the processor-related functions of the power-intensive operation. However, the airflow direction through the compute node 10 will carry heat from the PCI device D1 past the CPU1 such that the CPU1 is more likely to experience critical operating temperatures that require throttling.

The operating system may then access table 50 to identify one or more processors that are directly connected to the CPU1 (i.e., are "one hop" away from CPU1). The table 50 shows that interconnect A directly connects CPU1 with CPU2, interconnect D directly connects CPU1 with CPU4, and interconnect E directly connects CPU1 with CPU3. As a result, the operating system may direct operations away from the CPU1 to any one or more of CPU2, CPU3 or CPU4. In such a situation, the operating system may select a target CPU to receive the operations based on any one or more criteria, such as the existing relative workloads or current temperatures of CPU2, CPU3 or CPU4.

Figure 5:
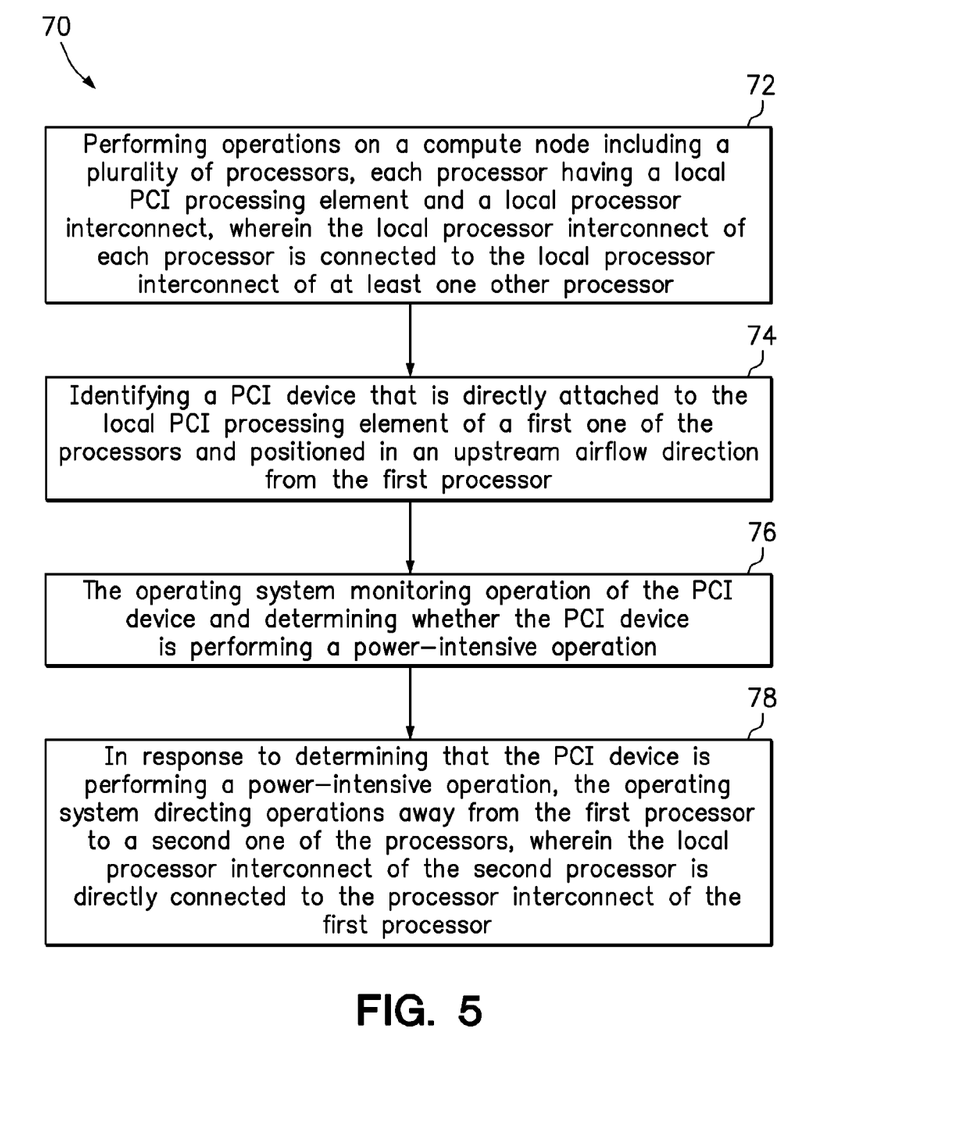
FIG. 5 is a flowchart of a method according to one embodiment of the invention.

FIG. 5 is a flowchart of a method 70 according to one embodiment of the invention. In step 72, the method includes performing operations on a compute node including a plurality of processors, each processor having a local PCI processing element and a local processor interconnect, wherein the local processor interconnect of each processor is connected to the local processor interconnect of at least one other processor. In step 74, the method includes identifying a PCI device that is directly attached to the local PCI processing element of a first one of the processors and positioned in an upstream airflow direction from the first processor. Step 76 includes the operating system monitoring operation of the PCI device and determining whether the PCI device is performing a power-intensive operation. Then step 78 includes, in response to determining that the PCI device is performing a power-intensive operation, the operating system directing operations away from the first processor to a second one of the processors, wherein the local processor interconnect of the second processor is directly connected to the processor interconnect of the first processor.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
performing operations on a compute node including a plurality of processors, each processor having a local PCI processing element and a local processor interconnect, wherein the local processor interconnect of each processor is connected to the local processor interconnect of at least one other processor;
identifying a PCI device that is directly attached to the local PCI processing element of a first one of the processors and positioned in an upstream airflow direction from the first processor;
an operating system monitoring operation of the PCI device and identifying a power-intensive task that the PCI device is performing; and
in response to identifying the power intensive task that the PCI device is performing, the operating system directing the identified power-intensive task away from the first processor to be handled by a second one of the processors, wherein the local processor interconnect of the second processor is directly connected to the processor interconnect of the first processor.

2. The method of claim 1, further comprising:
flowing air through the chassis from front to back to cool the plurality of processors and the PCI device.

3. The method of claim 1, further comprising:
the operating system routing operations from a device driver for the PCI device to the second processor.

4. The method of claim 1, further comprising:
the operating system receiving an interrupt request from the PCI device and causing the interrupt request to be handled by the second processor.

5. The method of claim 1, further comprising:
transitioning the first processor to a reduced power-state.

6. The method of claim 1, further comprising:
a unified extensible firmware interface providing system hardware topology information to the operating system.

7. The method of claim 6, wherein the system hardware topology information identifies that the PCI device is directly attached to the first processor.

8. The method of claim 6, wherein the system hardware topology information identifies which of the processors are connected through the processor interconnects of those processors.

9. The method of claim 6, wherein the system hardware topology information is provided to the operating system using an advanced configuration and power interface table.

10. The method of claim 1, wherein the PCI device is a network adapter.

11. The method of claim 1, wherein the PCI device is a PCI disk drive.

12. The method of claim 11, wherein the power-intensive operations are write operations.

13. The method of claim 11, wherein the PCI disk drive is hot-pluggable into a bay of a chassis containing the plurality of processors, wherein the bay is directly in front of the first processor.

14. The method of claim 11, further comprising:
identifying the temperature of the first processor;
determining whether the temperature of the first processor is greater than a setpoint temperature, wherein the operating system directs operations away from the first processor to the second processor only in response to determining that the temperature of the first processor is greater than the setpoint temperature.

15. A computer program product comprising a non-transitory computer readable storage medium having program instructions embodied therewith, the program instructions executable by a processor to:
perform operations on a compute node including a plurality of processors, each processor having a local PCI processing element and a local processor interconnect, wherein the local processor interconnect of each processor is connected to the local processor interconnect of at least one other processor;
identify a PCI device that is directly attached to the local PCI processing element of a first one of the processors and positioned in an upstream airflow direction from the first processor;
monitor operation of the PCI device and identify a power-intensive task that the PCI device is performing; and
in response to identifying the power intensive task that the PCI device is performing, direct the identified power-intensive task away from the first processor to be handled by a second one of the processors, wherein the local processor interconnect of the second processor is directly connected to the processor interconnect of the first processor.

16. The computer program product of claim 15, the program instructions further executable by the processor to:
route operations from a device driver for the PCI device to the second processor.

17. The computer program product of claim 15, the program instructions further executable by the processor to:
receive an interrupt request from the PCI device and cause the interrupt request to be handled by the second processor.

18. A method, comprising:
performing operations on a compute node including a plurality of processors, each processor having a local PCI processing element and a local processor interconnect, wherein the local processor interconnect of each processor is connected to the local processor interconnect of at least one other processor;
identifying a PCI disk drive that is directly attached to the local PCI processing element of a first one of the processors and positioned in an upstream airflow direction from the first processor;
an operating system monitoring operation of the PCI disk drive and determining whether the PCI disk drive is performing a write operation or a read operation; and
in response to determining that the PCI disk drive is performing a write operation, the operating system directing the write operation away from the first processor to a second one of the processors, wherein the local processor interconnect of the second processor is directly connected to the processor interconnect of the first processor.

19. The method of claim 18, further comprising:
determining whether the write operation being performed by the PCI disk drive involves greater than a setpoint amount of data, wherein the operating system directs the write operation away from the first processor to the second processor only in response to detecting that the write involves greater than the setpoint amount of data.

* * * * *